May 17, 1932. H. L. McKOWN 1,859,000
HEATING STOVE
Filed Feb. 6, 1930 2 Sheets-Sheet 1

Inventor
Harry L. McKown

By Clarence A. O'Brien
Attorney

May 17, 1932. H. L. McKOWN 1,859,000
HEATING STOVE
Filed Feb. 6, 1930 2 Sheets—Sheet 2
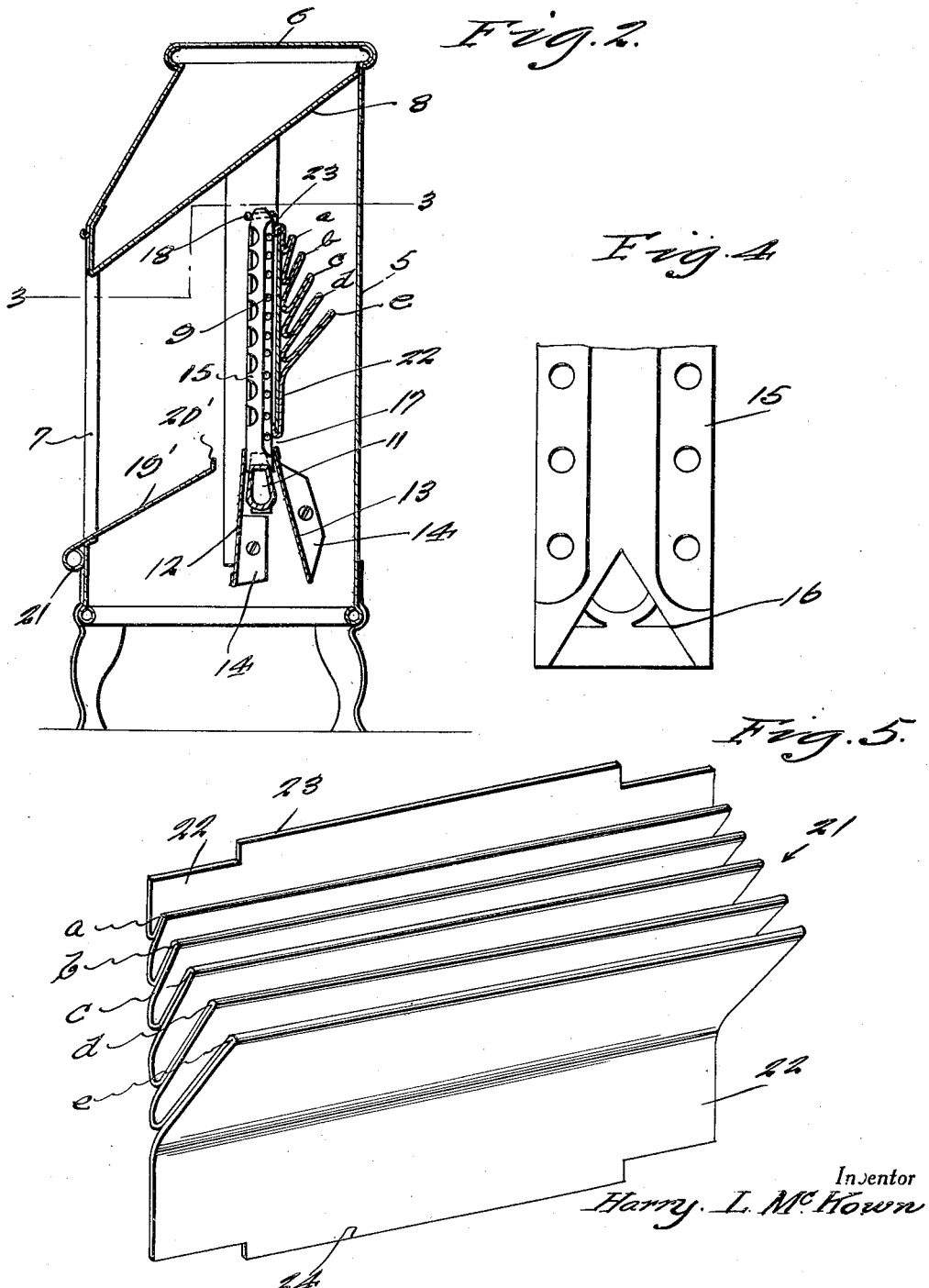

Patented May 17, 1932

1,859,000

UNITED STATES PATENT OFFICE

HARRY L. McKOWN, OF WHEELING, WEST VIRGINIA

HEATING STOVE

Application filed February 6, 1930. Serial No. 426,352.

This invention appertains to new and useful improvements in heating stoves and is an improvement over my co-pending application, Serial No. 351,360, filed March 30, 1929, which has merged into the U. S. Letters Patent No. 1,752,387, issued April 1, 1930.

The principal object of this invention over my above patent is the provision of means for removing vapor from the heated air, so that only a drying heat is produced.

It is submitted that a heating stove constructed in accordance with this invention will be far more satisfactory from a heat-giving standpoint, than any stoves now on the market, and from a far more important viewpoint, the invention has the advantage of eliminating the deadly gas which is produced in heating stoves where vapor emanates with the combusted products to provide a gas which is not only injurious to animals, but considerably harmful to human beings.

By reading the following specification and claims, other important objects and advantages of the invention will more readily become apparent to the reader.

In the drawings:—

Fig. 2 represents a vertical transverse sectional view through the stove.

Fig. 4 is a fragmentary rear elevational view of one of the special mantles.

Fig. 5 is a perspective view of the fluted structure for catching condensation.

Figure 1:
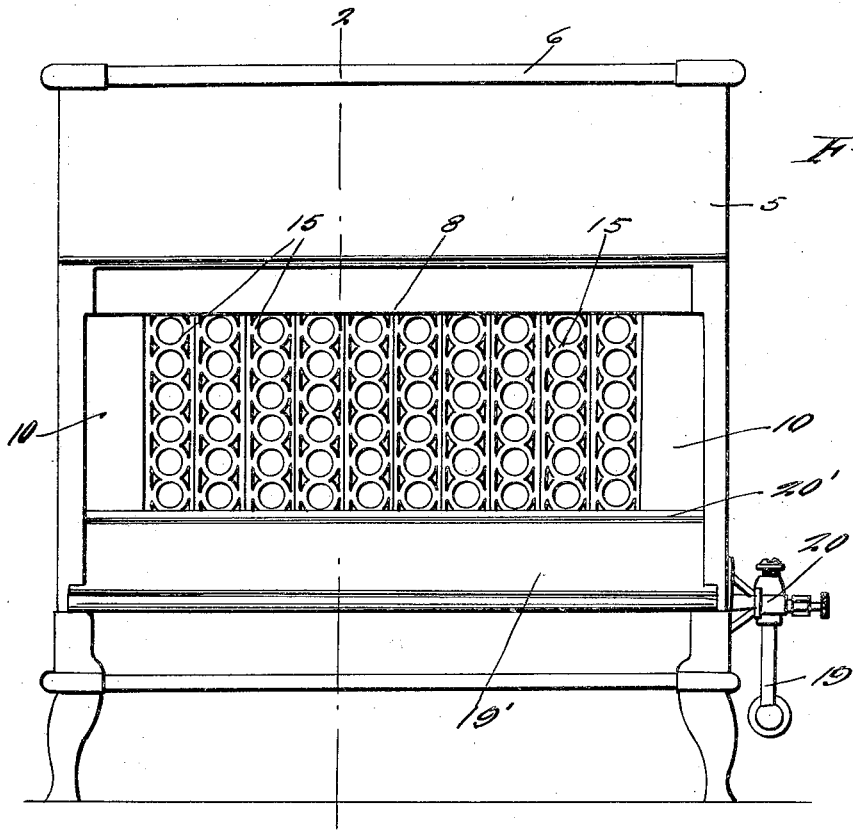
Figure 1 represents a front elevational view of the novel stove.

Referring to the drawings wherein like numerals designate like parts, it can be seen that the structure disclosed in the drawings, includes a casing 5, closed at its top as at 6, and open at its front as at 7.

The back of the casing is closed, while a rearwardly inclined partition 8 is arranged within the upper portion of the casing, in the manner clearly shown in Fig. 2.

The bottom of the casing 5 is open and disposed vertically within the casing is the partition 9, terminating at its upper end in spaced relation to the partition 8 and in spaced relation at its lower end with the bottom of the casing 5. The partition 9 is constructed at each vertical edge to provide a hollow post structure 10, which is suitably secured to the end walls of the casing 5, by spotwelding or some other suitable means.

The burner is of the gaseous fuel type, and is denoted by numeral 11. The burner is of elongated construction, and extends longitudinally through the major portion of the casing 5, adjacent the open bottom thereof. A pair of aprons 12 and 13, are arranged in spaced downwardly diverging relation with respect to each other, and at opposite sides of the burner 11.

Furthermore the aprons 12 and 13 are in spaced relation with respect to the burner 11 and project at their upper end portions a substantial distance above the burner, as in the manner substantially shown in Fig. 2. Each of these aprons 12 and 13 is flanged at its ends as at 14, whereby they are secured to the end walls of the casing 5.

The mantles are of tubular fabricated construction and each is denoted by numeral 15. The lower rear side portion of each of the mantles is provided with a V-shaped opening 16 to receive the air entering from behind the partition 9 through the space 17 between the lower edge of the partition 9 and the upper edge of the rear apron 13.

These mantles are arranged upon the burner 11 in side by side relation, and a swingable bail 18 at the upper end of the partition 9 is engageable over the front sides of the mantle, to prevent the same from becoming displaced from upright position.

A heat deflecting plate 19' is arranged through the open front 7 so as to deflect heat from the mantle outwardly. This plate is preferably highly polished on its top side and is flanged upwardly as at 20', its upper edge portion. The lower edge portion of the plate 19' is rolled as at 21, and it is preferable that the same assume the position substantially as shown in Fig. 2.

Figure 3:
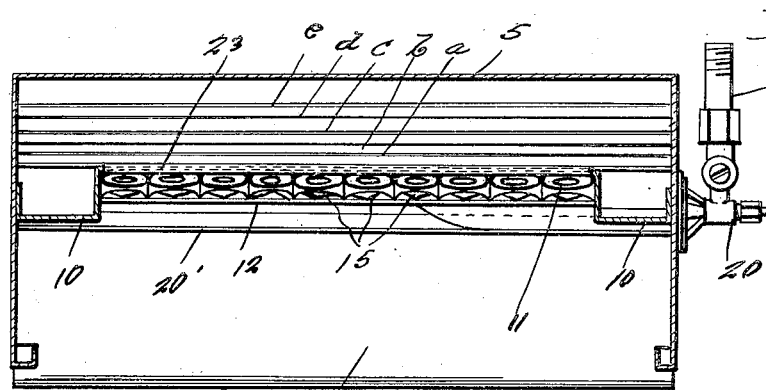
Fig. 3 is a horizontal sectional view thru the novel stove.

In Figs. 1 and 3, the fuel supply pipe is denoted by numeral 19, leading to the burner 11, through the valve structure 20. The main feature of this invention resides in the vapor eliminating and condensation collector generally referred to by numeral 21. This condensation catching unit comprising a plate 22 having a tongue 23 at its upper edge and a tongue 24 at its lower edge, the tongue 23 being bendable over the upper partition 9 while the tongue 24 is adapted to be bent around the lower edge of the partition 9 and against the forward side as in the manner clearly shown in Fig. 2.

The extent of this plate 22 is such as to permit a plurality of baffles to be formed. These baffles are denoted by a, b, c, d, and e, and each is formed by disposing the plate 22 outwardly and then backwardly.

These baffles increase in width successively in a downward direction, and as clearly apparent in Fig. 5 form V-shaped gutters. It can now be seen that when the gas is ignited, the flames will pass upwardly through the mantles 15, and when the latter become incandescent, heat radiating therefrom will be deflected from the plate 19' outwardly. A steady circulation of air is maintained within the casing, in that cold air will pass upwardly between the aprons 12 and 13, through the mantles, and over the upper edge of the partition 9.

As the heated air passes downwardly, there is a certain amount of vapor therein, which when mixed with the combusted fuel produces a very harmful gas. However, when the heated air meets the baffles a, b, c, d, e, and as many more as desired, the same will enter the pockets thereof and by reason of this retardation of the flow, condensation of the vapor takes place and this condensation remains in the pocket while the air passes on in a heated but dry state.

This dry air passes through the opening 17 between the lower edge of the partition 9 and the upper edge of the apron 13, and is re-heated in passing upwardly through the mantles 15.

This means for eliminating the deadly gas from the heated air is a highly important feature and advancement in the art.

While the foregoing description employs specific terms to describe the invention, it is to be understood that numerous changes in the shape, size and materials may be resorted to without departing from the spirit and scope of the invention as claimed hereinafter.

Having thus described my invention, what I claim as new is:—

1. A heating stove of the character described comprising a casing, having an open front, a vertically disposed partition mounted within the casing, a burner mounted at the lower portion of the partition and in spaced relation thereto, a plurality of baffles arranged on the rear side of the partition for retarding the flow of heated air to collect vapor thereon, and a pair of aprons, one at each side of the burner and between which the cold air rises.

2. A heating stove of the character described comprising a casing having an open front, a vertically disposed partition mounted within the casing, a burner mounted at the lower portion of the partition and in spaced relation thereto, a plurality of baffles arranged on the rear side of the partition for retarding the flow of heated air, said baffles forming troughs to collect vapor therein, and a plurality of mantles arranged upon the burner and against the front side of the said partition.

3. A heating stove of the character described comprising a casing open at its bottom and front, a vertically disposed partition in the said casing, a burner disposed within the casing in spaced relation to the lower edge of the said partition, a baffle structure secured to the rear side of the said partition, said baffle structure comprising a plate, the intermediate portion of the said plate being bent at intervals to provide obliquely disposed troughs, the upper and lower edges of the said plate being secured to the partition, said troughs being disposed in a rearwardly inclined position, when the said plate is secured to the said partition.

4. In a heater, a casing having an open front, a burner mounted within said casing, upright mantles arranged over said burner, a back wall located rearward of said mantles and occupying spaced relation to the rear wall of the casing for providing an intermediate passageway, said back wall having its upper end spaced from the overlying portion of the heater to provide a passageway thereover and having its lower end positioned to provide a passage leading thereunder to said burner, said back wall having trough-forming baffles formed thereon and extending into said passageway.

5. In a heater, a casing having an open front, a burner mounted within said casing, upright mantles arranged over said burner, a back wall located rearward of said mantles and occupying spaced relation to the rear wall of the casing for providing an intermediate passageway for downwardly coursing heated air, said back wall having on its rear side rearwardly extending trough-forming baffles for collecting moisture of condensation.

6. In a heater, a casing having an open front, a burner mounted within said casing, upright mantles arranged over said burner, a partition-like back wall located rearwardly of said mantles, and a plurality of transversely extending baffles arranged on the rear side of said back wall, said baffles being relatively positioned to form intermediate moisture collecting troughs.

In testimony whereof I affix my signature.

HARRY L. McKOWN.